(12) United States Patent
Jeffery et al.

(10) Patent No.: US 9,101,812 B2
(45) Date of Patent: Aug. 11, 2015

(54) METHOD AND SYSTEM TO ANALYZE SPORTS MOTIONS USING MOTION SENSORS OF A MOBILE DEVICE

(71) Applicant: Ai Golf, LLC, Mesa, AZ (US)

(72) Inventors: Mark John Jeffery, Mesa, AZ (US); Robert Sunshin Komorous-King, Berkeley, CA (US); Manoj Rana, Naperville, IL (US)

(73) Assignee: Aquimo, LLC, Mesa, AZ (US)

( * ) Notice: Subject to any disclaimer, the term of this patent is extended or adjusted under 35 U.S.C. 154(b) by 86 days.

(21) Appl. No.: 13/655,366

(22) Filed: Oct. 18, 2012

(65) Prior Publication Data

US 2013/0102419 A1    Apr. 25, 2013

Related U.S. Application Data

(60) Provisional application No. 61/713,813, filed on Oct. 15, 2012, provisional application No. 61/580,534, filed on Dec. 27, 2011, provisional application No. 61/551,388, filed on Oct. 25, 2011.

(51) Int. Cl.
*A63F 9/24* (2006.01)
*A63B 69/00* (2006.01)
(Continued)

(52) U.S. Cl.
CPC .............. *A63B 69/00* (2013.01); *A63B 24/0003* (2013.01); *A63B 69/36* (2013.01);
(Continued)

(58) Field of Classification Search
CPC ............... A63B 69/00; A63B 2225/20; A63B 24/0003; A63B 24/0062; A63B 69/36; A63B 2071/0625; A63B 2243/0029; A63B 24/0084; A63B 69/38; A63B 2024/0015; A63B 2071/0636; A63B 2220/30; A63B 2220/53; A63B 2220/833; A63B 67/02; A63B 69/0002; A63B 69/0024; A63B 69/3676; A63B 71/0622; A63F 13/00; A63F 13/005; A63F 2300/204; A63F 2300/69
USPC .................................................... 463/3, 42
See application file for complete search history.

(56) References Cited

U.S. PATENT DOCUMENTS 6,183,365 B1    2/2001    Tonomura et al.
7,789,742 B1    9/2010    Murdock et al.
(Continued)

FOREIGN PATENT DOCUMENTS

EP    1810724 A1    7/2007
JP    2004113689 A    4/2000
(Continued)

OTHER PUBLICATIONS

Press Release, "iPING brings 'Fit for Stroke' update to app for iPhone 4 & iPod touch", 2 pages, Aug. 16, 2011.
(Continued)

*Primary Examiner* — Steve Rowland
(74) *Attorney, Agent, or Firm* — Morgan Law Offices, PLC

(57) ABSTRACT

A method and system to analyze sports motions using the motion sensors of a mobile device, such as a smart phone, is provided. This method uses the mobile device motion sensor output to define the impact point with a virtual object, such as a golf ball, baseball or tennis ball. The motion sensor signature of the sports motion is analyzed for characteristics, specific to each type of sports motion. A method is disclosed using multiple sensors outputs in a mobile device to compute the impact point with a virtual object, such as a golf ball, baseball, tennis ball. Further, a method is disclosed where moving virtual sports objects interact with virtual sports motions and the responsive outputs are displayed on the mobile device and/or any Web-enabled display device.

44 Claims, 12 Drawing Sheets

(51) Int. Cl.

| | | |
|---|---|---|
| *A63B 69/36* | (2006.01) | |
| *A63F 13/00* | (2014.01) | |
| *A63B 24/00* | (2006.01) | |
| *G09B 19/00* | (2006.01) | |
| *A63F 13/428* | (2014.01) | |
| *A63F 13/211* | (2014.01) | |
| *A63F 13/22* | (2014.01) | |
| *A63F 13/335* | (2014.01) | |
| *A63F 13/31* | (2014.01) | |

(52) U.S. Cl.
CPC ............. *A63B69/3632* (2013.01); *A63F 13/00* (2013.01); *A63F 13/211* (2014.09); *A63F 13/22* (2014.09); *A63F 13/31* (2014.09); *A63F 13/335* (2014.09); *A63F 13/428* (2014.09); *G09B 19/00* (2013.01); *G09B 19/0038* (2013.01); *A63B 2220/30* (2013.01); *A63B 2220/44* (2013.01); *A63B 2243/0004* (2013.01); *A63B 2243/005* (2013.01); *A63B 2243/0016* (2013.01); *A63B 2243/0029* (2013.01); *A63B 2243/0041* (2013.01); *A63B 2243/0054* (2013.01); *A63B 2243/0075* (2013.01); *A63B 2243/0083* (2013.01); *A63B 2244/16* (2013.01)

(56) References Cited

U.S. PATENT DOCUMENTS

| | | |
|---|---|---|
| 7,796,548 B2 | 9/2010 | Lee |
| 7,806,777 B2 | 10/2010 | Cheng |
| 7,927,216 B2 | 4/2011 | Ikeda et al. |
| 7,942,745 B2 | 5/2011 | Ikeda et al. |
| 8,029,359 B2 | 10/2011 | Cheng |
| 2002/0019763 A1 | 2/2002 | Linden et al. |
| 2005/0054457 A1 | 3/2005 | Eyestone et al. |
| 2005/0113183 A1 | 5/2005 | Noble |
| 2006/0063980 A1 | 3/2006 | Hwang et al. |
| 2008/0291220 A1 | 11/2008 | Cheng et al. |
| 2008/0319787 A1 | 12/2008 | Stivoric et al. |
| 2009/0029793 A1* | 1/2009 | Cage .............................. 473/324 |
| 2009/0183010 A1 | 7/2009 | Schnell et al. |
| 2010/0267443 A1 | 10/2010 | Shimamura et al. |
| 2010/0304804 A1 | 12/2010 | Spivack |
| 2011/0190061 A1 | 8/2011 | Takeda et al. |

FOREIGN PATENT DOCUMENTS

| | | |
|---|---|---|
| JP | 2010011926 A2 | 1/2010 |
| KP | 2001003645 B1 | 1/2010 |
| KR | 101059258 B1 | 8/2011 |
| KR | 1010592581 B1 | 8/2011 |
| WO | 2004056425 A2 | 7/2004 |
| WO | 2005113079 A2 | 12/2005 |
| WO | 2008052605 A1 | 5/2008 |
| WO | 2011085494 A2 | 7/2011 |

OTHER PUBLICATIONS

Press Release, "PING introduces iPhone and iPod putter fitting application", 1 page, Jul. 19, 2011.
Press Release, "PING's new iPING putter app targets consistency for improved putting", 2 pages, Jun. 14, 2011.
Tech Tips and Toys, New iPing Putter App—for iPhone, Jun. 19, 2011 (Retrieved on http://techtipsandtoys.wordpress.com/2011/06/19/new-iping-putter-app-for-iphone.
European Search Report and Communication from the EPO accompanying the European Search Report, dated Apr. 15, 2015, for European Patent Application No. 12844477.5-1658.

* cited by examiner

METHOD AND SYSTEM TO ANALYZE SPORTS MOTIONS USING MOTION SENSORS OF A MOBILE DEVICE

CROSS-REFERENCE TO RELATED APPLICATIONS

The present application claims priority of provisional applications Ser. No. 61/551,388 to Jeffery et al., entitled "Using a Mobile Phone With Integrated Motion Sensing For Evaluation of Sports Motions and Providing Customized Sports Instructions Responsive to Said Evaluation", filed on Oct. 25, 2011; Ser. No. 61/580,534 to Jeffery et al., entitled "Using a Mobile Phone With Integrated Motion Sensing For Golf Swing Evaluation and Customized Golf Club Fitting", filed on Dec. 27, 2011; and Ser. No. 61/713,813, to Jeffery et al., entitled "Method to Analyze Sports Motions Using Multiple Sensor Information From a Mobile Device", filed on Oct. 15, 2012; each of which is incorporated herein by reference.

BACKGROUND OF THE INVENTION

1. Field of the Invention

The present invention relates to a method and system to analyze sports motions using motion sensors of a mobile device.

2. Description of the Related Art

There is extensive prior art in the evaluation of sports motions, particularly golf swings. For example, several manufactures provide launch monitors which use high speed video cameras to analyze the launch angle and velocity of a golf ball. Additionally, there is disclosure in the prior art of the use of various devices attachable to a golf club to capture motion data for further analysis. For instance, WIPO Publication No. WO2011085494 to Hashimoto et al. describes a system of motion sensors attachable to a physical golf club with data analyzed by a personal computer. Similarly, U.S. Published Patent Application No. 2005/0054457 to Eyestone et al. discloses a clip-on motion sensor that can attach to a physical golf club with data collection on a device with a Bluetooth connection. Furthermore, PING, Inc. has developed a putting analysis system wherein users hit physical balls while putting, and motion sensors in a mobile phone clipped onto the physical golf club provide data used by an application to analyze the putt, and to compare results to that of professional golfers. However, such prior art systems and methods require impact with a physical ball, and/or use of, or attachment to, sports equipment.

In the world of computer gaming, several sports-related games have been introduced that utilize motion sensors. For example, the Nintendo Wii is a popular gaming console, and the Wii controller contains a 3-axis accelerometer connected via infrared to a gaming console. The Nintendo Wii controller is connected via a Bluetooth connection to the gaming console and senses acceleration in three axes using the accelerometer. The Wii controller also features a PixArt optical sensor, which in combination with a 10 LED sensor bar placed several feet from the user and physically connected to the game console, allows the determination of where the Wii remote is pointing. An add-on to the Wii controller is available which includes a gyroscope, but with or without, the Wii requires the user to purchase an entire gaming system which is expensive, cumbersome, and requires physical attachment to a television.

SUMMARY OF THE INVENTION

One aspect of the disclosure relates to a method of analyzing sports motions. The method comprises determining a starting point of a sports motion to be simulated using a mobile device having integrated motion sensors; moving the mobile device from the starting point along a path to complete the simulation; obtaining motion data from the motion sensors relating to the starting point and the movement along the path; determining an occurrence of a simulated sports event using the obtained motion data; and outputting information related to the simulated sports motion; wherein the mobile device is not attached to any piece of sports equipment and the starting point is not indicated by user-entered input. In an embodiment, the starting point is indicated by the mobile device being held still for a predetermined length of time. In an embodiment, the information related to the simulated sports event includes outputting the information on a screen of the mobile device, for example. In another embodiment, the information related to the simulated sports event includes outputting the information to a gaming system.

In an embodiment, the sports event that is determined is the impact point with a virtual object, such as a virtual golf ball. In the case of golf, the mobile device would be used in place of a golf club to simulate a full golf swing, a chip, or a putt. In an embodiment specifically for a full golf swing, the impact point is determined by finding a moment when the pitch of the mobile device is at or near a second minimum. In another embodiment, the impact point is determined by finding a moment when the pitch of the mobile device is at or near a minimum and the derivative (rate of change) of yaw of the mobile device is at or near a maximum.

The method of analyzing sports motions further can include the step of determining the velocity of the virtual object around the impact point using gyroscope data (without requiring an accelerometer) along with data for the estimated arm length, club length, and arc length for the swing type. In another embodiment, the instantaneous velocity of a virtual object can be determined using a suitable accelerometer. In an embodiment, a multiplier can be applied to the velocity based on estimated wrist hinge and forearm rotation as measured by yaw and roll, respectively, of the mobile device at the impact point, included in the obtained motion data.

The method of analyzing sports motions can include the step of analyzing the simulated sports motion. Analyzing the simulated sports motion can include analyzing the pitch of the mobile device during the simulated sports motion and the roll of the mobile device at an impact point, for golf for example. Analytical information regarding the sports motion (e.g., golf swing) can be presented on the mobile device for the user, or a Web-enabled display connected to a cloud-based server via the Internet.

In an embodiment, the sports event is a release point, e.g., the release point of a bowling ball, a lacrosse handle, a basketball, a baseball, a hockey stick, a bean bag, and a fishing rod.

The method can be further extended to include sport motions involving hitting virtual object(s) that are moving (such as a baseball, a hockey puck, a tennis ball, a ping pong ball, a shuttle cock, etc.) with virtual sports equipment (such as a baseball bat, a hockey stick, a tennis racquet, a ping pong paddle, a badminton racket, etc.) The method can also be used to analyze sport motions that result in impact with objects at some distance from the player, such as a virtual fly fishing hook cast towards a fish, a virtual bowling ball striking bowling pins, a virtual basketball thrown at a virtual hoop, a virtual American football thrown at a running virtual receiver, a virtual bean bag or a virtual javelin thrown at a target.

Another aspect of the disclosure relates to a method of analyzing sports motions. The method comprises (a) displaying a moving virtual object on a screen of a web-enabled display; (b) obtaining motion data from motion sensors of a mobile device, the motion data relating to a simulated sports motion; (c) determining a starting point of the sports motion and movements along a path of the sports motion, using the obtained motion data; (d) comparing timing of the simulated sports motion with that of the moving virtual object to determine whether the virtual object was impacted, and if so, the impact point; and (e) outputting information related to the simulated sports motion; (f) wherein the web-enabled display is a separate and distinct device from the mobile device and viewable by a user of the mobile device as the user moves the mobile device to simulate the sports motion; the web-enabled display and the mobile device are connected via the Internet to a cloud-based engine; and the cloud-based engine manages game playing and is at least partly responsible for performance of step (d). The web-enabled display can be one of a computer, a tablet, a web-enabled television, and another mobile device that is connectable to the Internet. In an embodiment, the game involves a thrown or hit object, and the virtual object is one of a baseball, a tennis ball, a racquet ball, a ping pong ball, a hockey puck, and a badminton shuttle cock. Displaying the virtual object can include displaying a video, a sprite, a cinema-graph, or an animation on the web-enabled display. In an embodiment, clocks of the cloud-based engine, the web-enabled display, and the mobile device are synchronized using the Network Time Protocol (NTP). In an embodiment, comparing timing includes using interpolation to determine the impact point.

In an embodiment, the method further comprises (g) displaying a virtual object flight on the web-enabled display responsive to the simulated sports motion. The virtual object flight can be a golf ball flight, a baseball flight, a tennis ball flight, or a ping pong flight, for example. In an embodiment, the method further comprises (h) displaying interaction with the virtual object flight on the web-enabled display. Such interaction can include catching or hitting the virtual object, which can be displayed using one or more of a video, a sprite, a cinema-graph, and an animation. The interaction can include the virtual object being hit back to the user, such that after step (h), steps (b) through (f) can be repeated to provide a game playing experience.

Another aspect of the disclosure relates to a system for analyzing sports motions, comprising a mobile device including a memory, a processor, and an integrated multi-axis gyroscope. The mobile device is configured to determine a starting point of a simulated sports motion; obtain gyroscope measurements from the gyroscope relating to orientation of the mobile device at the starting point and during movement along a path simulating the sports motion; determine an impact point with a virtual object and velocity of the mobile device around the impact point using the obtained gyroscope measurements; and output information related to the simulated sports motion. In an embodiment, the mobile device is attached to an ancillary device (e.g., a golf club or weighted golf grip).

Another aspect of the disclosure relates to a system for analyzing sports motions, comprising a mobile device including a memory, a processor, and integrated motion sensors. The mobile device is configured to determine a starting point of a simulated sports motion, the starting point indicated by the mobile device being held still for a predetermined length of time; obtain motion data from the motion sensors relating to orientation of the mobile device at the starting point and during movement along a path simulating the sports motion; determine an impact point with a virtual object using the obtained motion data related to the orientation of the mobile device along at least two axes; and output information related to the simulated sports motion via the mobile device. In an embodiment, the mobile device is attached to an ancillary device.

Other aspects and embodiments of the invention are also contemplated. The foregoing summary and the following detailed description are not meant to restrict the invention to any particular embodiment but are merely meant to describe some embodiments of the invention.

DETAILED DESCRIPTION OF THE INVENTION

As used herein, a mobile device refers to a hand-held device having a microprocessor, memory, and integrated motion sensors.

As used herein, calibration point refers to the location in time and space of the mobile device in a set-up position prior to the start of the sports motion.

As used herein, impact point refers to the location in time and space of impact with a virtual object.

As used herein, release point refers to the location in time and space of the release of a virtual object.

In some sports, such as golf, the impact point and release point may be the same physical location in time and space. However, in other sports the impact point and release point may not coincide. For example, in lacrosse the ball is caught by a long-handled stick (the ball impacts the lacrosse stick at the impact point) and then is later thrown from the stick from a different location (at the release point). Furthermore, in some sports there is only a release point since there is not a point of impact. For example, in fly fishing the release point occurs by a flick of the wrist imparting angular momentum to the fishing rod, which above a certain maximum value causes the weighted fish hook to release from the rod.

Figure 1:
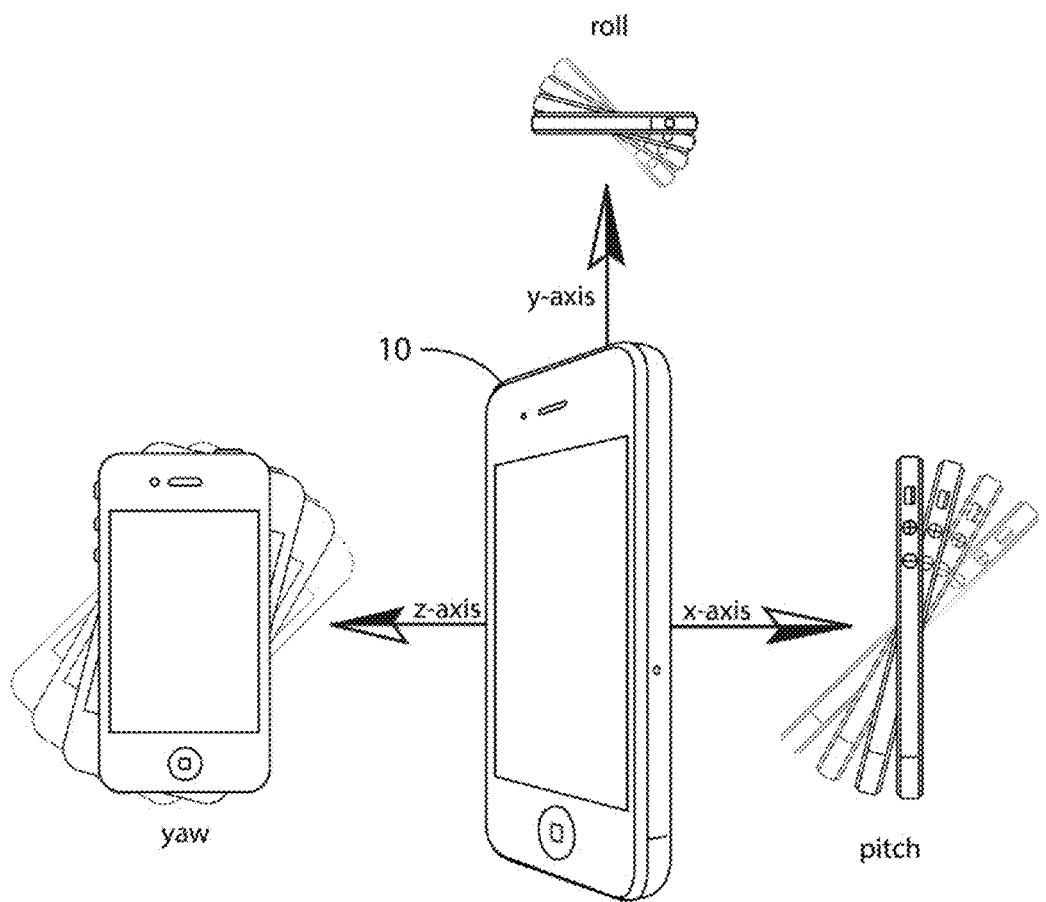
FIG. 1 illustrates various types of rotational movement measured by internal motion sensors of a mobile device.

FIG. 1 illustrates the various types of rotational movement measured by internal motion sensors of a mobile device 10 such as an Apple iPhone 4Gs, an Apple iPod Touch, or a Samsung Galaxy III smart phone. These sensors of the mobile device 10 include an accelerometer to capture X, Y and Z acceleration data (expressed in G's along a respective axis), and a gyroscope to measure pitch, roll and yaw of the mobile device 10 as it moves (expressed in radians with respect to a respective axis). At present, the motion sensors sample at about 100 times per second (100 hertz), with this data made available (by either polling or having the data pushed) to an application program loaded on the mobile device 10. A representative gyroscope useable in conjunction with the present invention is the L3G4200D gyroscope made by STMicroelectronics, Inc. However, it is to be understood that the present invention is not limited to motion sensor technology currently available.

Figure 2:
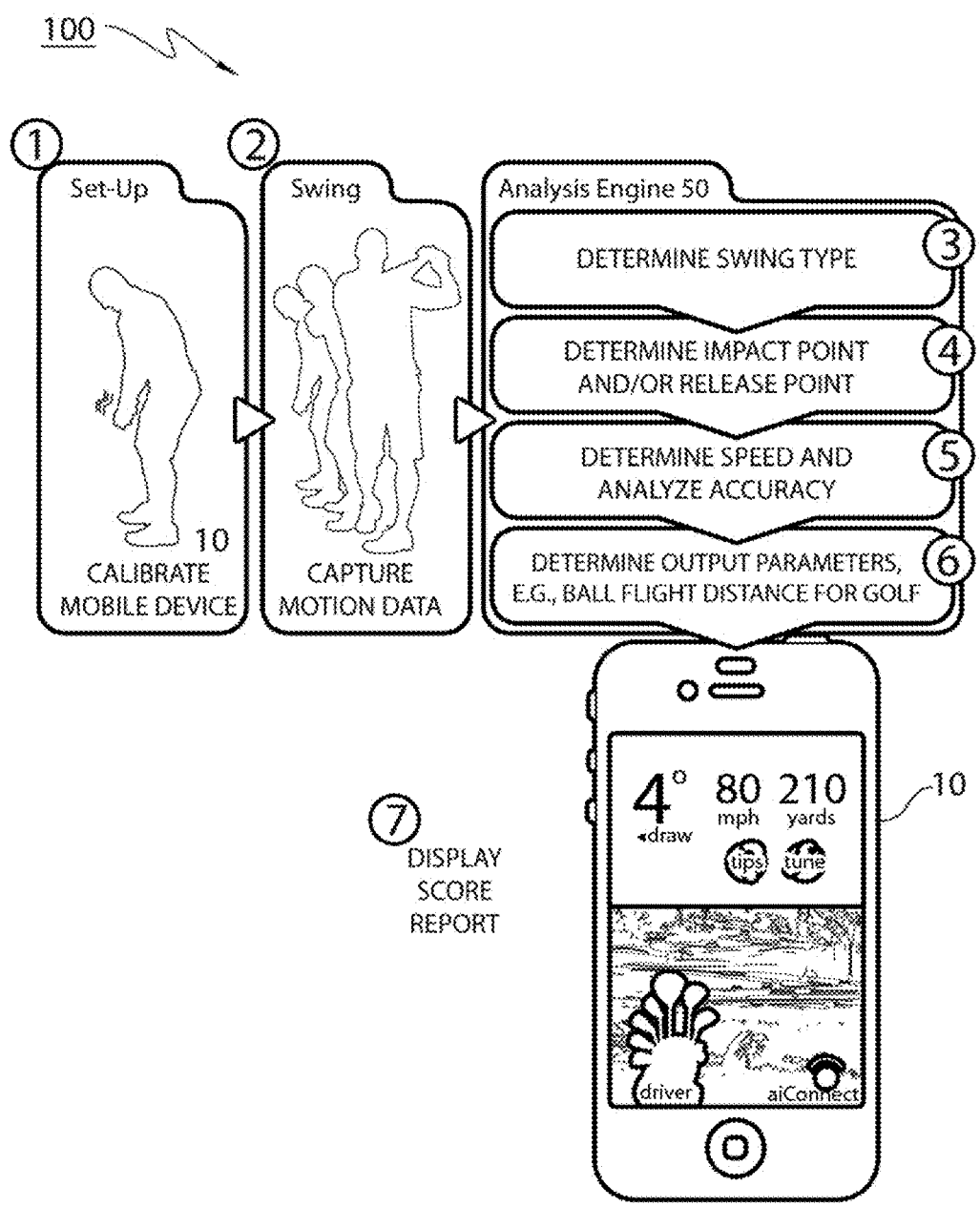
FIG. 2 illustrates a system to analyze sports motions using the motion sensors of the mobile device.

FIG. 2 illustrates a system for analyzing sports motions 100. As shown, the system for analyzing sports motions 100 includes an analysis engine 50 which can include an application program loaded in memory of the mobile device 10. Such an application program for an Apple iPhone can be developed using the Apple Developer Suite, including use of Xcode, Interface Builder, and iPhone Simulator development tools, or via custom programming in Objective C. The Core Motion framework can be used to obtain and manage the accelerometer and gyroscope data. It is to be understood that where the mobile device 10 is other than an Apple iPhone, other programming techniques and tools can be used. For example, where the mobile device 10 is a smart phone utilizing the Android operating system, an appropriate Android software development kit (SDK) can be used to provide the tools and application program interfaces (API) for developing the application on the Android platform using the Java programming language.

A notable feature of the system for analyzing sports motions 100 is that initially (1) the user holds the mobile device 10 still for a predetermined length of time (e.g., at least 1 second for golf), which represents the "zero" calibration of the mobile device 10, this is the calibration point for the sports motion. The set-up position of the player and calibration point will be different for different sports: for golf the set-up is the address position of the golf swing, for baseball it is the location of the ball on a virtual tee, in tennis or table tennis, it can be the at rest position for the racquet before swinging.

Note that the calibration point need not be a specific setup position where the mobile device 10 is held still for one second in the same position. For tennis and table tennis the calibration point may be obtained from any point where the player has his or her hands in a ready position to play, and/or may be selected as an end point or calibration point of a prior sports motion.

Next, the user takes a swing (2) and the motion sensor data is obtained by the analysis engine 50 during the swing (by polling, for example). The analysis engine 50 next detects the swing type (3). The swing type can either be entered by the user via a screen of the mobile device 10 (for example, selection from a pull-down menu listing 'full golf swing', 'chip' 'putt') or detected based on the motion signature, and, perhaps also another factor such as, in the case of golf, club selection (e.g., a wedge is selected and the motion signature shows that the user only swung back 30 degrees so the type of swing is a chip). Next, the analysis engine 50 detects impact with a virtual object and/or the release point (4), analyzes the motion signature to calculate the motion variables (for golf, the swing speed and accuracy of the swing) (5), and determines the key output parameters (for golf, the ball flight distance) (6). Finally, information regarding the swing can be displayed on the graphical output on the mobile device 10 (7) or a separate web-enabled display. Alternatively, or in addition, information regarding the swing can be used as inputs to a gaming system, such as is disclosed in co-pending Ser. No. 61/641,825 to Jeffery et al., entitled "Web-Based Sports Game Platform With Mobile Phone Motion Sensor Input", filed on May 2, 2012, which is incorporated herein by reference.

These and other novel elements of the invention will become apparent from the following detailed description of the invention in the context of a golf swing sports motion and then with respect to other sports motions including baseball and bowling. However, it is to be understood that the following examples are not meant to be limiting.

Golf Example

Figure 3:
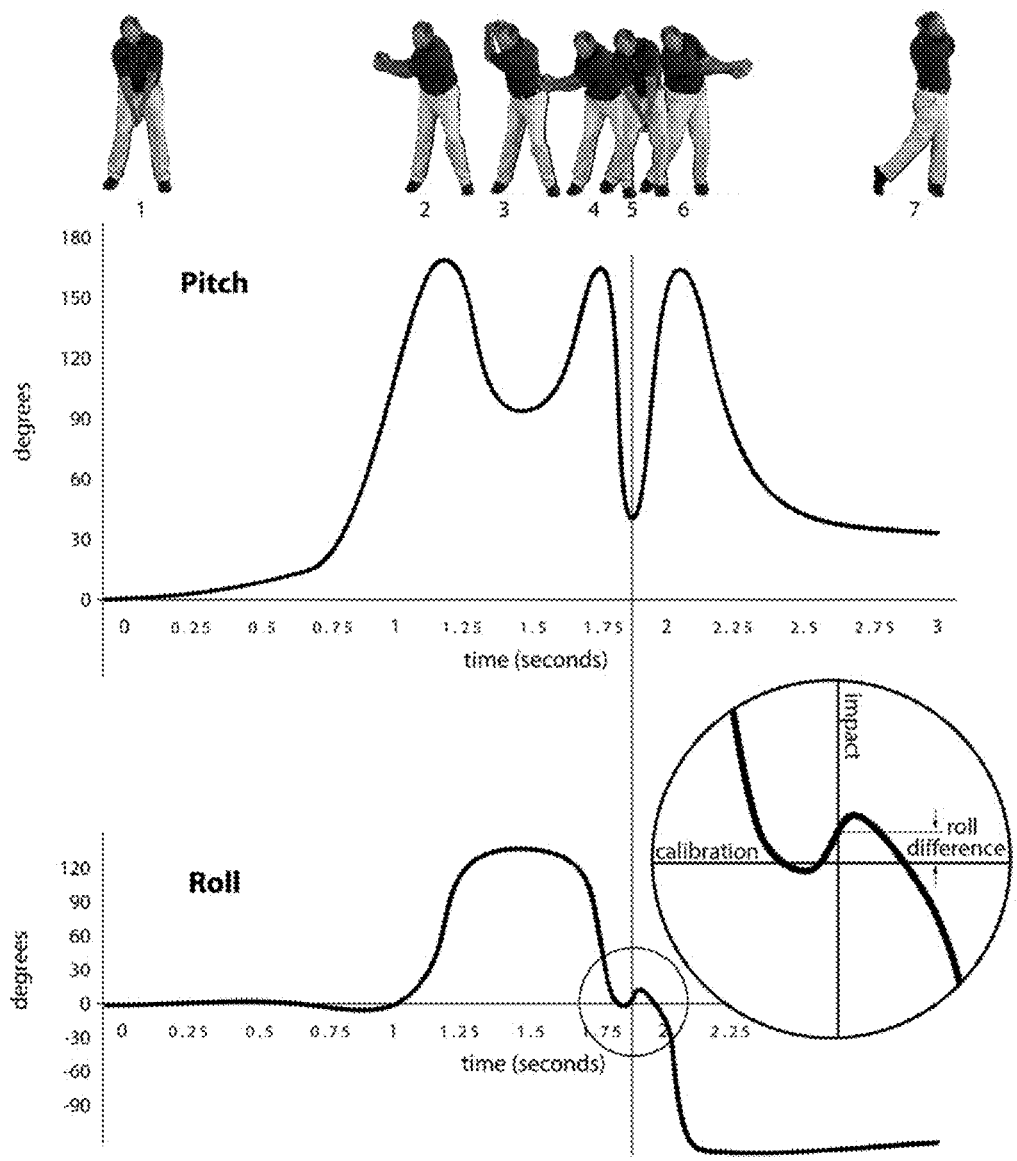
FIG. 3 illustrates the pitch and roll of the mobile device during an example full golf swing useful for determining swing accuracy.

FIG. 3 illustrates the pitch and roll of the mobile device 10 during an example full golf swing. An important element of the present invention is the calibration of the mobile device 10 by holding the mobile device 10 still in the address position (position 1). The motion signature for the pitch then increases in the backswing (position 2) and has a local minimum at the top of the golf backswing (position 3). However, the minimum (position 3) is an artifact of the pitch motion sensor rotating more than 180 degrees. In actuality, the pitch continues to increase to a maximum, greater than 180 degrees, at the top of the backswing. However, limitations of the sensor constrain the motion signature to 0 to 180 degrees. The pitch data continues to decrease in the downswing (position 4), back to the impact point (position 5), as shown.

Accuracy Analysis

Note that at the impact point (position 5), the mobile device 10 has returned to near the initial calibration point (position 1), which for golf is the hand position at impact with a virtual golf ball and a local minimum. For a high speed golf swing the minimum at the impact point does not return exactly to the calibration zero due to resolution limits of the gyroscope. Determining the impact point is of vital importance because the roll of the mobile device 10 at this point defines the hook or slice of the club. In other sports, the impact point is vital in determining the hook and slice of a bat or a racquet, and/or the release point in throwing or casting sports. From the impact point, the golf swing continues through follow through, positions (6) and (7).

In summary, pitch data, or the rotation around the axis that cuts the mobile device 10 into top and bottom halves when looking at the screen (X-axis) (see FIG. 1) is the most telling data stream as a golfer moves through their swing. Impact can be found at the major minimum that approaches the starting calibration point (which is defined as "zero" by taking the average of all phone position/orientation data over the course of one second, for example, taken prior to the swing when the golfer is in their set-up position). To bring context, in a golfer's swing, pitch data rises as the golfer goes into their backswing, returns to calibration as he or she swing through impact, then rises again as he or she moves into their follow through. Impact is the pitch position that gets closest to the set-up, or calibration point.

In an embodiment, the impact point for a full golf swing is selected to be the second minimum of pitch using a crawler algorithm. In another embodiment, the minimum can be confirmed by aligning it with a spike in Z-acceleration. When more than one major minimum in pitch is found, the minimum selected as impact is determined by which point has the greatest Z-acceleration. This confirmation helps in cases where a golfer's backswing or follow-through rotation is so great (near 360 degree rotation from set-up) that the gyroscope flips completely and creates extra minimums near calibration.

Once impact is found, swing accuracy is determined by subtracting roll data at impact from roll data at calibration. Roll data, or the rotation around the axis that cuts the phone into left and right halves when looking at the screen (Y-axis) describes "open and closed" face positions on the club head. FIG. 3 shows an expanded view of the roll data. Swings that return a negative difference mean that the user over-rotated at impact which implies a closed face at impact and a resulting draw or hook depending on the amount. Swings that return a positive difference mean that the user under-rotated at impact which implies an open face at impact and a resulting fade or slice. Swings that return a near zero value mean the club face very closely matched calibration orientation at impact and imply a straight ball flight.

Speed Analysis

Club head speed is a critical parameter for golf in defining the ball flight distance. The golf club manufacturers have empirical tables which detail the ball flight distance for golf balls hit by club heads moving at a specific swing speeds. Such tables also take into consideration the club type (e.g., driver, 5-iron, putter), the club head loft, the shaft stiffness, and other variables that impact the ball flight.

Swing speed is a complex calculation due to the mechanics of sports motions. The challenge is that the sensors measure motions of the hands whereas we are interested in calculating the speed of virtual sports equipment, such as a golf club head. Extensive experiments with professional athletes were conducted using appropriately fitted sports equipment to understand how hand and arm motions translate to the motion sensor data outputs. While the analysis for golf is illustrated, it is to be appreciated that the present method is generalizable to other sports motions, such as those found in the sports of baseball, tennis, bowling, basketball, American football and table tennis.

Figure 4:
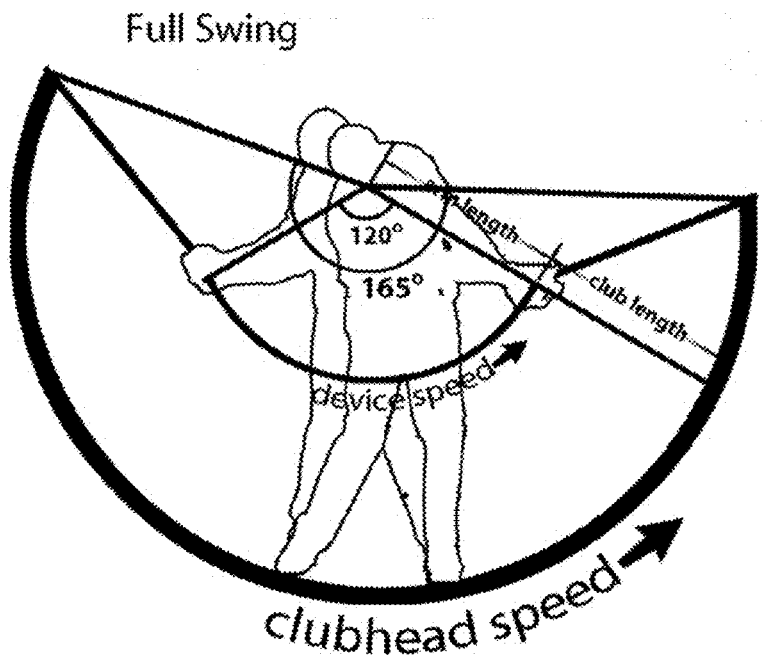
FIG. 4(a) illustrates a technique for calculating club head speed for a full golf swing.
FIG. 4(b) illustrates a technique for calculating club head speed for a golf chip.
Figure 4B:
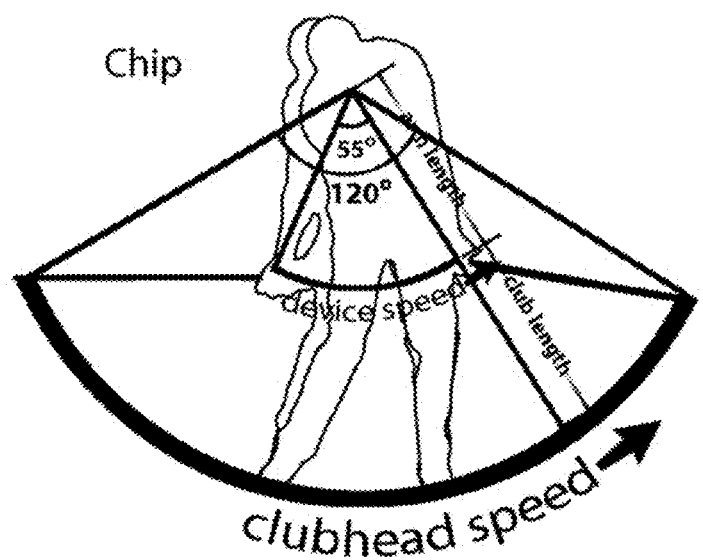

FIG. 4 illustrates the swing motion elements for (a) a golf full swing and (b) a chip, which is a short swing. If the club is swung exactly in line with the arms, then the mobile device velocity, V, is related to the club head velocity ($V_{club\ head}$) by:

$$V_{club\ head} = V \times (\text{Arm Length} + \text{Club Length})/\text{Arm Length} \quad (1)$$

However, expert players hinge their wrist and rotate their forearms to increase the velocity of the club head through the ball. These hinging and rotating motions can dramatically increase the velocity of the club head through impact, so that Equation (1) is a gross under estimate of the golf swing speed for most golfers. It is a good for putting, however, since there is no hinging of the wrists.

Figure 5:
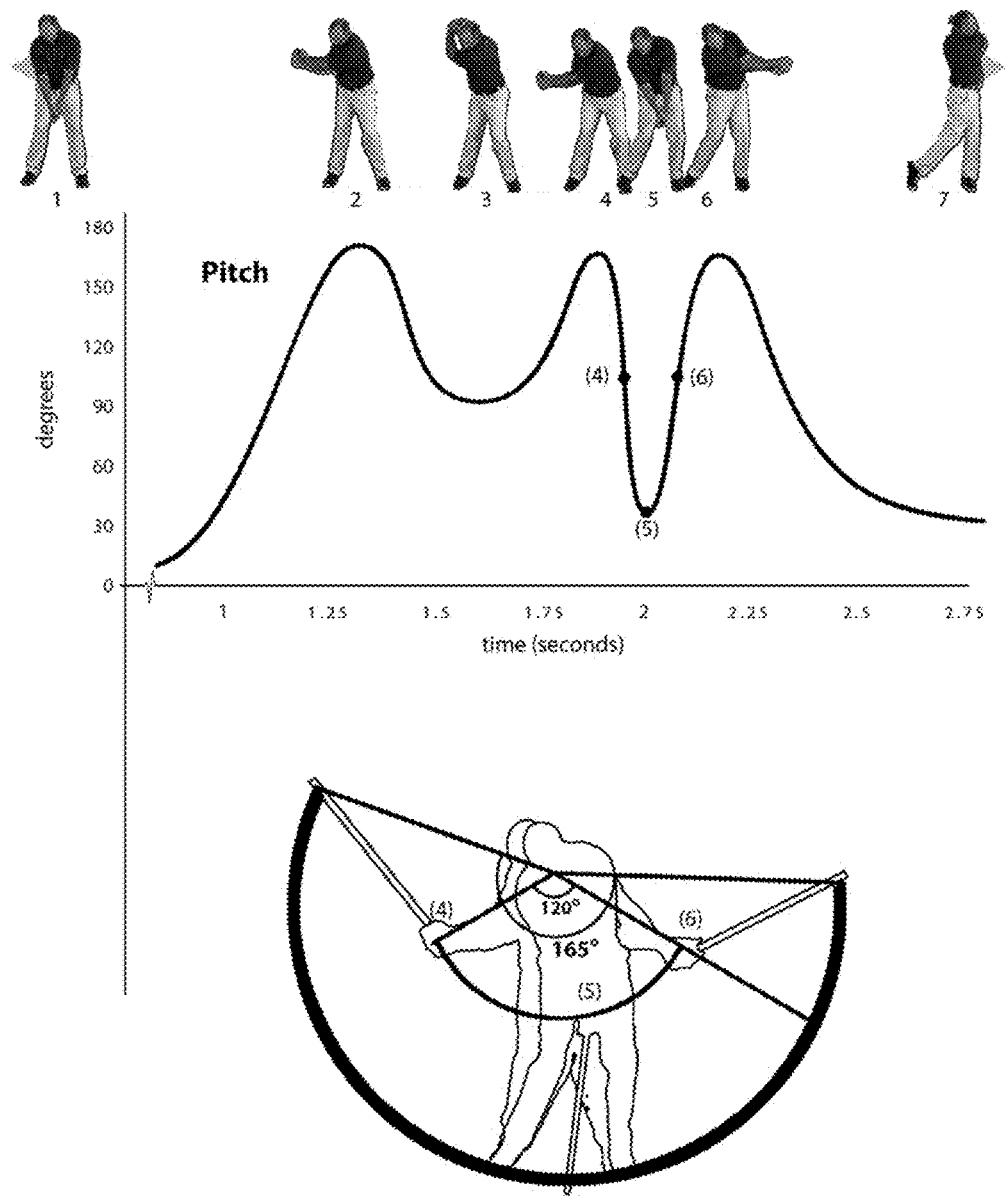
FIG. 5 illustrates use of pitch data of the mobile device to determine the impact point and the speed of the club head through the impact point.

FIG. 5 illustrates specifically how we calculate the speed of the mobile device 10 for a golf swing. The motion signature for the pitch of the mobile device 10 for an example full golf swing is graphically illustrated. Shown below is the corresponding sports motion with points (4), (5) and (6) in pitch data labeled on the swing. We first find the impact point in pitch data, defined as the local minimum of pitch at the bottom of the swing (point 5). We then look forward and back in pitch data by 60 degrees. These data points, assuming proper wrist hinging, align with positions in the swing (4) and (6). Generally, about one tenth of a second passes between these two positions, so that given the player's arm length we can find the mobile device speed 10 around impact by dividing the length of a 120 degree arc where the radius of the arc is equal to the arm length by the amount of time passed: This delivers the speed of the mobile device 10 (hand speed). A similar method can be used for chipping but with a shorter arc length of 55 degrees or less due to the reduced swing length.

It has been found, using high speed video clocking, that the driver club head speed can be as slow as 2.4 times hand speed (this is in the case of a user swinging a club with rigid arms, forearms, and wrists) or as fast as 6 times hand speed (in the case of a world class professional golfer). The difference between these two multipliers comes from the combination of forearm rotation and wrist hinge which allow golfers to force the club head to travel through a much greater arc length (sometimes even close to 180 degrees) in the time it takes the hands to travel through the 90 degrees of arc length around impact. The multiplier we choose is driven directly by gyroscope acceleration through impact on the Z and Y axis (yaw and roll) which account for wrist hinge and forearm rotation respectively.

From detailed experiments with the iPhone 4 and 4s it was found that the gyroscope is particularly accurate, so that the roll data is very good to predict hook or slice within approximately half a degree. The accelerometer data from the iPhone 4, however, is "noisy", and is not particularly accurate over the entire golf swing, but does work well for measuring forearm rotation rate around impact. This is why we divide the swing into portions and calculate an average velocity, V, of the mobile device through impact:

$$V = \frac{D_2 - D_1}{t_2 - t_1} \quad (2)$$

where $D_2-D_1$ is the distance between points (4) and (6) in FIG. 5; and $t_2-t_1$ is the time taken to cover the distance $D_2-D_1$. A shorter distance is preferred, since this enables a closer approximation of the instantaneous velocity at the impact point. However the 0.01 sec resolution of the current gyroscope requires us to use the 120 degree arc. In the future, as the sampling resolution of the gyroscope increases, a 30 degree arc or less will be preferred.

Equation (2) is an approximation of the actual instantaneous velocity of the phone, and is only a first order approximation of the speed of the golf club head, since it does not include the wrist hinge or forearm rotation described above. Via detailed experiments with a high-speed video camera we were able to find multipliers for these variables, with the result of calculating club head speed within +/−10% for a variety of swing types. From club head speed we can predict ball flight distance in ideal conditions.

We envision that the data quality output from the accelerometer will improve dramatically in future versions of iPhone or Android based phones. In an embodiment of the present invention, the velocity of a mobile device 10 (having a sufficiently accurate accelerometer) at impact is calculated by integrating the acceleration from the top of the backswing ($t_{bs}$) to the zero ($t_0$) of the mobile device:

$$V_x = \int_{t_{bs}}^{t_0} a_x dx$$

$$V_y = \int_{t_{bs}}^{t_0} a_y dy$$

$$V_z = \int_{t_{bs}}^{t_0} a_z dz$$

with the total mobile device velocity at impact:

$$V = \sqrt{V_x^2 + V_y^2 + V_z^2} \quad (4)$$

where $t_0-t_{bs}$ is the time between the minimal at the top of the back swing ($t_{bs}$) measured from the pitch data and the zero at the bottom of the swing at impact, $t_0$. The integrals are calculating in the software using a fourth order Runge-Kutta algorithm. See for example, William H. Press et al, Numerical Recipes 3rd Edition: The Art of Scientific Computing, 2007.

The velocity component vectors (4) are difficult to accurately calculate with the current version of the accelerometers, since the internal accelerometer has a noisy output, hence why we currently use the average method equation (2). Data on the swing motion is presented to the user and stored, local to the app and on a server in the user's account, for longitudinal comparisons of swing consistency improvement.

The user can also attach the phone to their golf club via a cradle and compare actual practice swings to the computed swings for distance and accuracy. We use a similar analysis when the phone is attached to the club, but the multipliers are different primarily due to users swinging the golf club slower than the phone, the phone is lighter than a golf club so one's hands naturally go faster.

As an additional example of swing analysis we consider putting, rather than the full swing of a golf club. PING, Inc. has previously created an iPhone App for putting. Their prior art invention has three significant limitations however: Their method (1) requires an attachment to a putter, (2) requires impact with a physical ball, and (3) is not accurate for long putts (greater than approximately 20 feet).

The method described herein does not have any of these limitations. Similar to the full swing described above, the user holds the mobile device 10 as if it were a putter, and after one second of being held still it vibrates: the phone is ready. The user then putts an imaginary (virtual) ball. Compared to the full swing, the pitch data from the phone is now a relatively smooth sine wave function with a minimum at impact. The putter stroke is analyzed similar to the full golf swing, but with average velocity calculated from Eq. 2 where $D_1$ and $D_2$ are the respective maximum distances pull back and stroke through impact with the ball. An advantage of the putter stroke is that the function is smooth and the speed is relatively slow compared to the full golf swing. Hence, equations (3) and (4) can also be used to calculate an instantaneous velocity at impact—we use both methods, integration of equations (3) and average velocity from Eq. (2), with a scale multiplier for the length of the putter for speed at the putter head at impact with a ball, see Eq. (1). For long putts the acceleration method becomes increasingly inaccurate, hence the average velocity method provides better results with a multiplier derived from empirical measurements.

From the speed of the putter head the distance the ball travels can be calculated assuming ideal conditions. Most important, however, is that we are able to quantify phone roll angle differences at impact (similar to hook or slice for the full swing) without impacting a physical ball. We can also analyze the gyroscope acceleration data for errors such as deceleration through the putt, or a left pull or right push (these last two errors are identified from the combination of the second integral of acceleration, and the roll data). Data on swing motion accuracy is also presented to the user and stored, local to the app and on the server in the user's account, for longitudinal comparisons of putting consistency improvement.

Multi-Sensor Impact Detection

A technique for detecting the "impact point" with a virtual object using a single type of rotational data (pitch) of the mobile device 10 was described above. The signature of the sports motion (pitch data as a function of time) was analyzed for characteristics, specific to the type of sports motion (e.g., a full golf swing). The a priori structure of the sports motion signature was necessary to isolate the location in time and space of the virtual impact point. In another embodiment, we extend our inventive concept to enable impact point detection for many different sports motion signatures, and for a wide range of motions.

Figure 6:
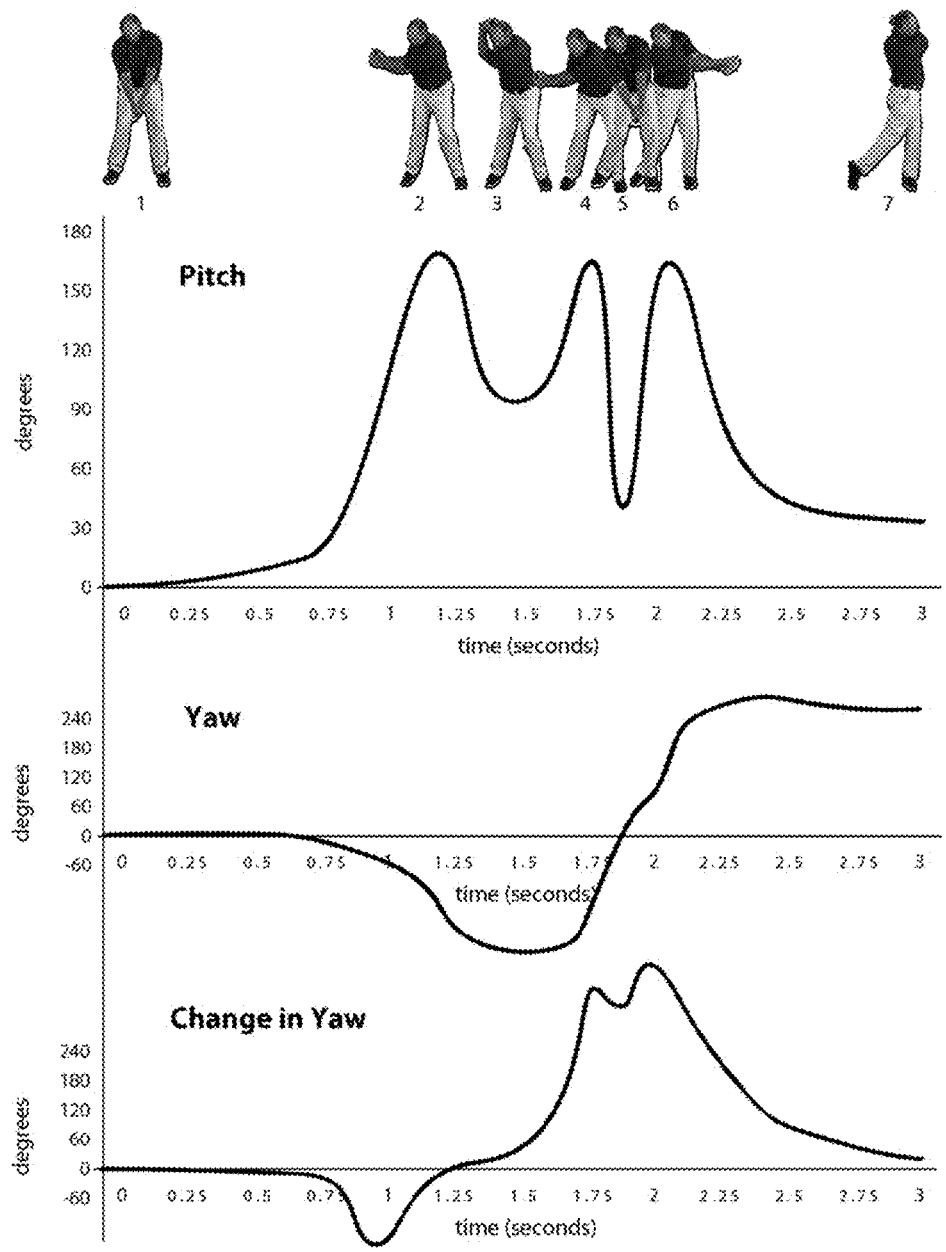
FIG. 6 illustrates use of pitch and yaw of the mobile device during an example full golf swing to determine the impact point.

FIG. 6 illustrates changes in pitch and yaw of the mobile device during an example full golf swing. In this case, the mobile device used was an Apple iPhone 4Gs. As noted above, calibration of the mobile device 10 is accomplished by holding the mobile device 10 still in the address position (position 1). The motion signature for the pitch then increases in the backswing, (position 2) and has a local minimum at the top of the golf backswing (position 3). However, the minimum (position 3) is an artifact of the pitch motion sensor rotating more than 180 degrees. As noted previously, in actuality, the pitch continues to increase to a maximum, greater than 180 degrees, at the top of the backswing. However, limitations of the sensor constrain the motion signature to 0 to 180 degrees. The pitch data continues to decrease in the downswing (position 4), back to the impact point (position 5), as shown.

From detailed experiments with high speed cameras we found that the virtual impact point (position 5) is a local minimum of pitch, where the mobile device has returned near to the initial address position (position 1). From the impact point (position 5), the golf swing continues through follow through (positions 6 and 7).

Determining the impact point is of vital importance because the roll of the phone at this point defines the hook or slice of the club, bat or racquet, and/or the release point in throwing or casting sports. The inventors have previously used crawler software to search the pitch motion signature for the second minimum. However this method is not universally applicable, since different swings have different motion signatures.

Figure 7A:
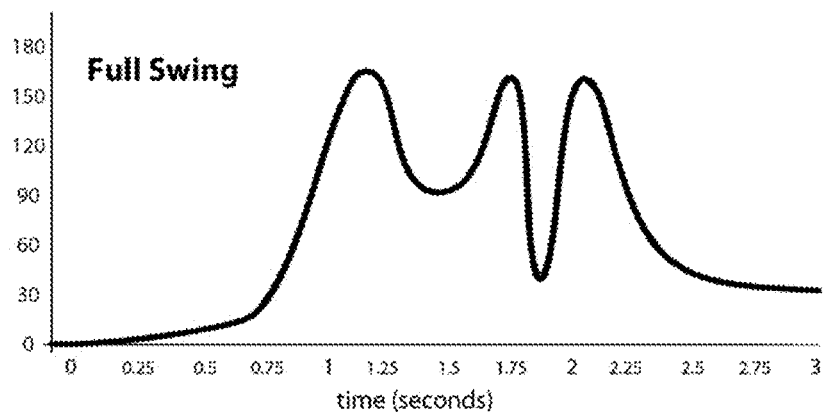
FIGS. 7(a) to (c) illustrate changes in pitch of the mobile device during an example full golf swing, chip, and putt, respectively.
Figure 7B:
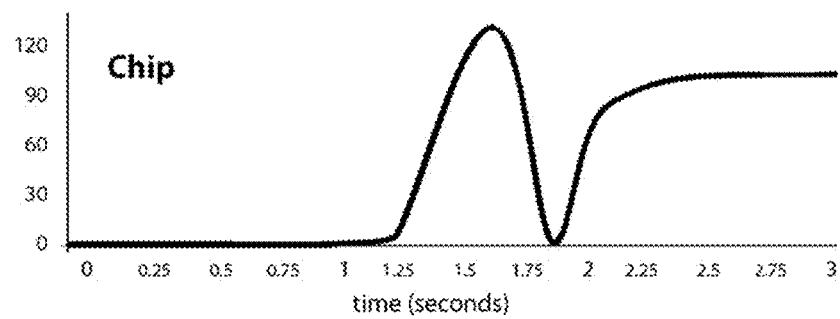
Figure 7C:
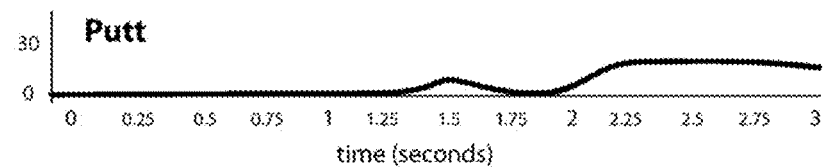

FIGS. 7(a) to (c) illustrates changes in pitch of the mobile device for three different types of golf swings. FIG. 7(a) shows a full golf swing of a professional golfer, 7(b) a golf chip, and 7(c) a golf putt. While the impact point is the same in all three cases, the motion signatures are quite different. Furthermore, even in a full golf swing, the basic motion signature can be different. Specifically, it was found that for older people playing golf, there is a tendency to abbreviate the back swing, so that the swing signature looks more like a chip.

Hence, the crawler method which searches for a specific feature of the motion signature of a single motion sensor output produces erroneous results. Specifically, in the case of golf, the motion signature for a professional golfer's full swing has an impact point at the second minimum of pitch data. However, FIGS. 7(b) and (c) do not have a second minimum; hence searching for the second minimum in these types of shots will create an error. Accordingly, the method of using motion signature data for single type of rotational measurement to obtain the impact point has limitations. In the present embodiment, we use at least two different types of rotational measurements (pitch and yaw in golf for example) to calculate the impact point and/or release point to overcome this.

Referring again to FIG. 6, the yaw of the mobile device through the golf swing is shown. In the case of golf and baseball swings, the yaw is changing rapidly through the impact point (5). FIG. 6 also shows the corresponding derivative, or slope, of the yaw. These data quantify the rate of change of the yaw sensor data. Note that the maximum rate of change is close to the impact point (5) for the golf swing.

Hence, using both pitch and yaw motion sensor data, one can isolate the impact zone by looking for the minimum of pitch motion data that has a maximum yaw derivative (change in yaw). This method works for all types of golf swings, and enables the accurate impact point detection for chips and putts, such as those shown in FIGS. 7(b) and (c).

Figure 8:
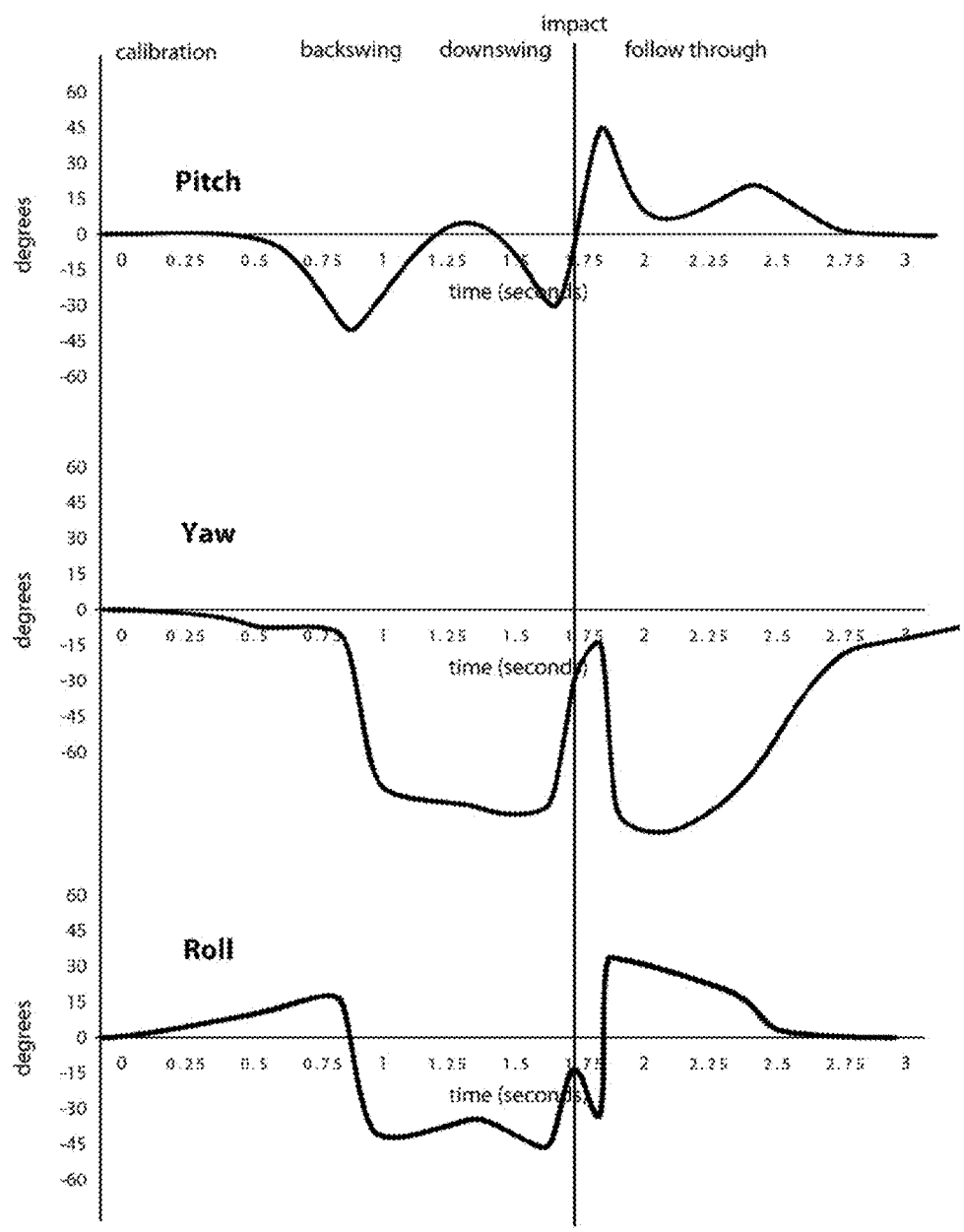
FIG. 8 illustrates changes in pitch, yaw and roll of the mobile device during an example tennis swing or seated horizontal golf swing.

This technique is generalizable to other types of sports motions. FIG. 8 is an example of a tennis forehand, or a seated horizontal golf swing. In this example the swing path is in the horizontal plane but with forearm rotation and wrist hinging around impact. Hence, the motion signature is different from a standing golf swing and the impact point in FIG. 8 for pitch is now a zero crossing of pitch data. The challenge is to detect the correct zero crossing. In this example, the yaw is a local maximum near the impact point. Hence again using two types of rotational measurements (pitch and yaw), see FIG. 8 "pitch" and "yaw", we can more accurately, and less erroneously, detect the impact point from the single sensor, in this case pitch. In the case of a tennis swing, see FIG. 8 "roll", the roll data at the impact point can be used to calculate the hook or slice spin imparted to the tennis ball.

Baseball and Bowling Examples

To illustrate preferred embodiments where the sports motion may (1) intersect with a moving virtual object and where (2) the release point and impact point is different from the calibration point, we provide examples for baseball and bowling.

Figure 9:
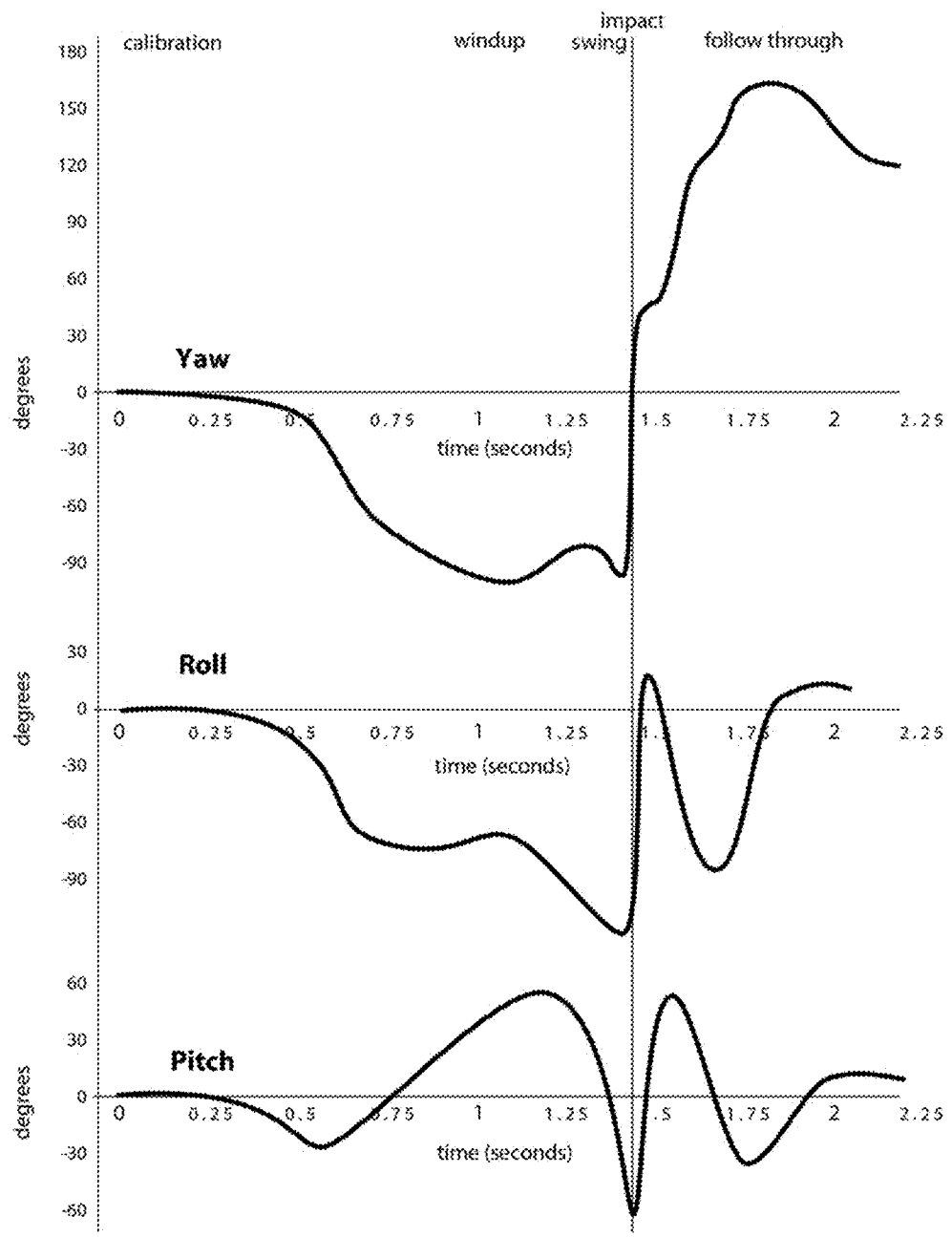
FIG. 9 illustrates yaw, roll and pitch for a baseball swing.

Baseball swing motion sensor data is illustrated in FIG. 9. For a baseball swing the calibration point is a set-up position with the mobile device 10 held in both hands out in front of the body, with the thumbs pointing so as to naturally line up the mobile device (virtual bat) with a ball on a virtual tee; the hands are perpendicular to the ground. The data shown in FIG. 9 is from a professional athlete and illustrates the essential features of an optimal baseball swing motion. For the baseball sports motion, yaw is the key variable, since as the "bat" is swung through the impact point with a virtual ball, the ideal hand position is with the palms parallel to the ground, which causes a rapid change in yaw of the mobile device through impact. The yaw at the calibration point was zero; hence the impact point is when the yaw crosses zero (see, FIG. 9, "yaw"), even though the mobile device is rotated ninety degrees relative to the calibration point. In an ideal baseball swing the roll of the bat occurs just after the impact point (see, FIG. 9, "roll"). In the event there is a roll maximum at the impact point, then the wrists have a tendency to lift the bat over the top of the ball, causing a ground or missed ball: this is the "swing bubble."

The pitch and yaw of the mobile device 10 taken together provide insights into the angle of the bat through the impact point. For example, the pitch data in FIG. 9 shows that the hands sloped downward at the impact point, since the pitch is negative at the impact point and does not return to zero until after the impact point, and hence the bat would have contacted the virtual ball if it were thrown below the calibration point, that is, in the lower half of the strike zone.

Jeffery et al., 61/580,534 and Jeffery et al 61/641,825 have disclosed a method using multiple displays wherein virtual sports instruction and/or games can be played using a web-enabled display device, such as a web-enabled TV, that is separate and distinct from the mobile device, and that coordinates presentation of the virtual sports instruction and/or games using the mobile device and the web-enabled display device via a cloud-based software engine. Accordingly, animations, lesson and other video may be presented on the display device physically separated from the mobile device and responsive to the mobile device motion sensor outputs, for example.

As an example of this embodiment for baseball, the player (1) stands in front of their HTML5 Web-enabled TV and calibrates the mobile device as above. (2) They then see a displayed video or an animation (which can include a sprite or a cinema-graph, or other visual enhancement) of a pitcher throwing the ball, the screen of the web-enabled TV positioned so that the pitcher appears directly in front of the hitter. The cloud-based software engine (3) synchronizes the time of the pitch and compares it to that of the swing (4) of the player, and the players motion sensor data is analyzed on the mobile device and is sent to the cloud-based software engine.

The time $t_{ball\ flight}$, it takes for the virtual pitch to reach the player can be calculated from $t_{ball\ flight} = d/v$ where d is the distance from the pitcher to home plate (60.5 feet for major league baseball or 45 feet for little league, as examples) and v is the velocity of the pitch. Assuming a 95 mph pitch in major league baseball, the time of flight of the baseball from the pitcher to home plate is 0.43 seconds. That is, $t_{ball\ flight} = 0.43$ seconds. The cloud-based engine compares the time stamp of the thrown pitch, $t_{pitch}$, plus $t_{ball\ flight}$ to the time stamp of the impact point, $t_{impact\ point}$. If they coincide within a predetermined time interval $$\Delta t = |t_{impact\ point} - (t_{pitch} + t_{ball\ flight})| \qquad (5)$$

less than or equal to δ seconds, 0.15 seconds for example, then the virtual bat can be assumed to have hit the virtual ball, and (6) an animation of the ball flight can then be rendered on the Web-enabled display via the cloud-based software engine. However, if $\Delta t > \delta$ seconds, the virtual bat is assumed to have missed the virtual ball and the swing is deemed a strike.

Preferably, the sports motion analysis and synchronization uses a synchronized mobile device 10, a cloud-based (or otherwise networked) software engine, and a Web-enabled display each with a fidelity of 0.1 seconds or less. Current web browsers have unreliable local clock time stamps and Javascript calls to the internal clock typically do not poll at exactly equal intervals. In a preferred embodiment, the Network Time Protocol (NTP) can be used to synchronize the computer systems over a packet-switched, variable-latency data network. We use the Java Script NTP client to acquire the time offsets of the clients (mobile device 10 and web page) and the server (cloud based software engine). This sets the initial coordinated time based upon an accurate external clock. We then schedule a Java Script callback using setInterval( ) at the highest reliable granularity possible, which is web browser dependent. We do not assume that the callback is being called at reliable intervals, however, but instead use the call new Date( ).getTime( ) from within the callback and apply the offset to get the actual coordinated time, and then interpolate to find the actual time of the pitch, $t_{pitch}$, and the virtual impact point, $t_{impact\ point}$. These data are then used to calculate Eq. (5).

Hence our method is generalizable and extensible to the use case where the sports motion is impacting a moving virtual object, such as a baseball or tennis ball, and can be similarly applied to tennis, badminton, table tennis, racquet ball, hockey, basketball, American football, and all other similar sports where the virtual sports object (e.g., ball, puck, shuttlecock) is in motion and then struck, thrown, or caught by the sports motion and the players virtual sports equipment.

Figure 10:
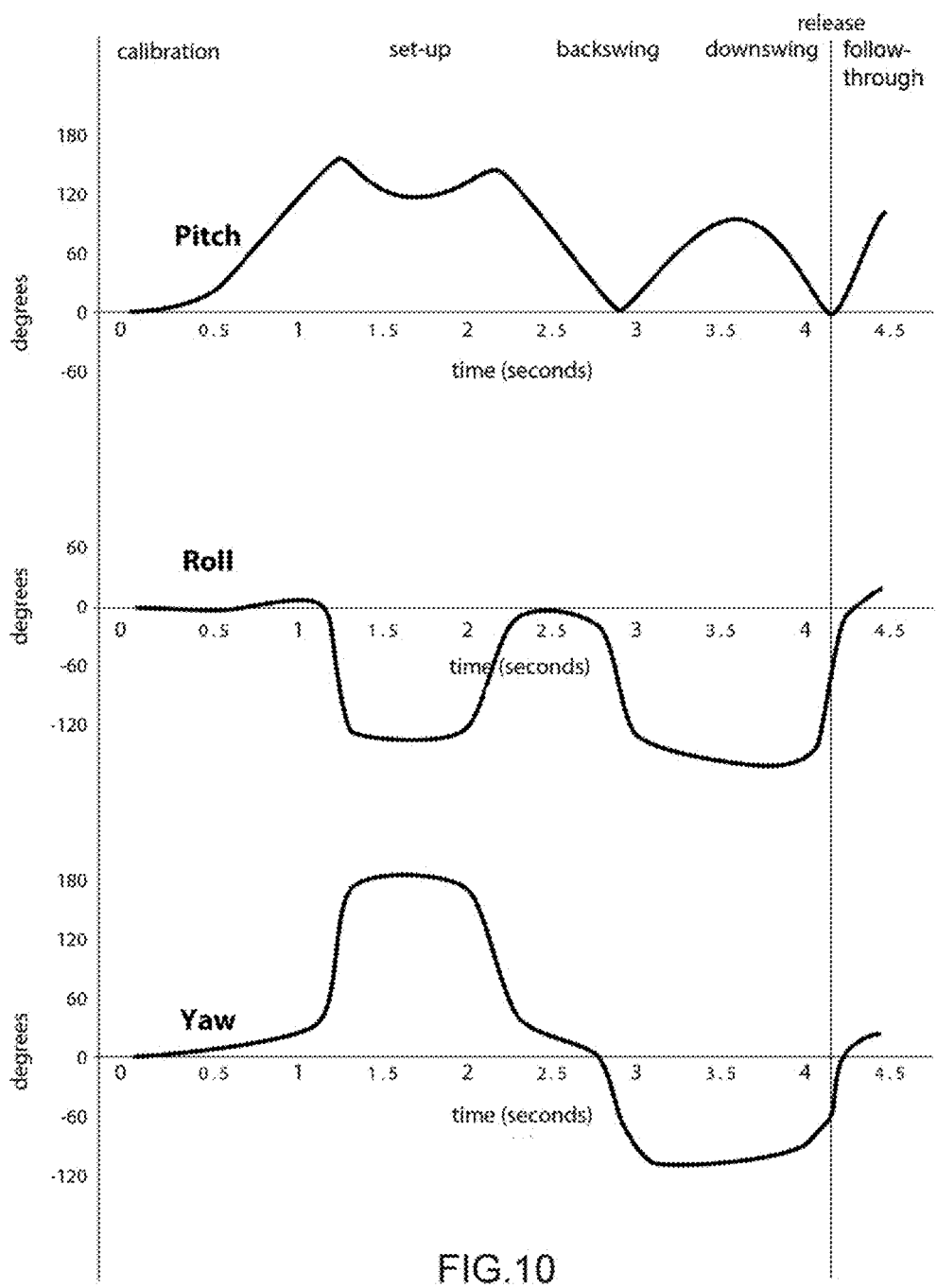
FIG. 10 illustrates pitch, roll and yaw for a bowling motion.

As a last example, we consider the use case where the release point is different from both the calibration point and the impact point. FIG. 10 illustrates the mobile device motion sensor data for a bowling sports motion. In this example, the calibration point is the hand at rest, relaxed and fully extended at the player's side, with the palm of the hand facing forward. The bowling motion is to first bring the virtual bowling ball up to the chin, cradled in both hands, and then to swing down and forwards while taking a few steps. The pitch data illustrates how the pitch of the mobile device 10 increases as the mobile device 10 is brought up to the chin, where there is a local minimum as the player starts to step forward. Then, the pitch decreases as the player swings down in the backswing motion, where there is a zero of pitch corresponding to the initial calibration zero, and then the motion transitions to the final downswings to a second zero, which is the release point of the virtual bowling ball.

Similar to the golf swing described previously, the velocity of the virtual bowling ball can be calculated from Eq. (2) and the time difference between 30 or 60 degree pitch points, similar to FIG. 5, or via integrating Eq.'s (3). The rate of change of the roll data, the derivative of roll, through the release point is proportional to the spin rate imparted to the virtual bowling ball. Hence we can calculate the velocity and spin of the virtual bowling ball at the release point.

Note in this example the release point is different in space from the calibration point, and the impact point is further removed from the release point. In this example, the impact point occurs in virtual space. Using a cloud-based system described previously for baseball, the bowling ball can be displayed on a virtual bowling lane on an HTML5 web-enabled display, such as a web TV, and the impact with the pins simulated in time and space given the velocity and spin of the virtual bowling ball, and the length of the virtual bowling lane. Hence, the player executes the virtual bowling motion, and sees the virtual bowling ball go down the lane and hit the pins on the Web-enabled display, with a path and speed determined by the velocity and spin calculated from the swing signature of the mobile device and synchronized in time to appear like a continuous motion.

Attachment to an Ancillary Device

Thus far, the description of the invention has been limited to use of the mobile device 10 to simulate a sports motion by the user holding the mobile device 10 in his or her hand and moving the mobile device 10 in a certain manner (e.g., swinging the mobile device 10 as if it were a golf club). However, advanced players may find it desirable to feel the grip of the sports equipment in sports such as golf, baseball, tennis or fly fishing, for example. In the case of golf, for a right handed player, advanced players may have a grip on the club so that the left hand is rotated approximately 20 degrees from center towards the body. Such a grip on the golf club handle enables the club head to be more closed through impact which in turn makes it easier to draw the golf ball, that is, create a ball flight that bends to the left.

The methods of the present invention relating to analysis of sports motions are generalizable to also include attachment of the mobile device to sports equipment, or to weighted grips simulating the sports equipment.

Figure 11:
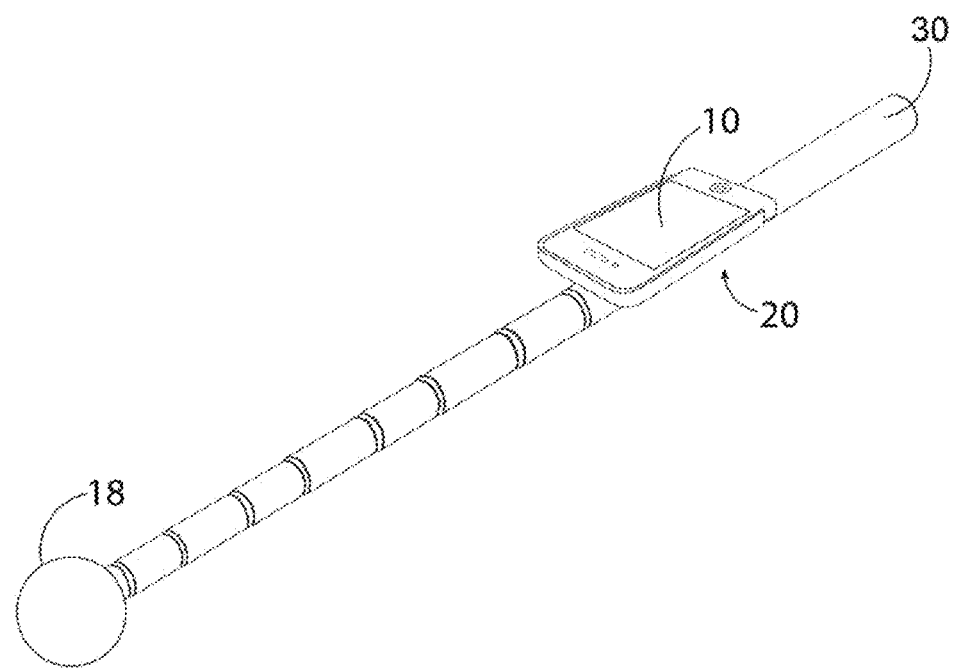
FIG. 11 illustrates an example mobile device holder mounted to an ancillary device.

As an example, FIG. 11 shows a mobile device holder 20 to securely mount the mobile device 10 to an ancillary device 30, which in the illustrated embodiment is a weighted golf grip but could instead (for golf) be a physical golf club. In an embodiment, the ancillary device 30 is comprised of a 24" long steel or graphite golf club shaft with a golf grip at one end and a 6 ounce weight 18 at the other. Preferably, the entire ancillary device 30 weighs approximately 11 ounces (similar to a golf club driver), and the center of mass is approximately 6-8" inches from the weight 18, so as to simulate an actual golf club, which typically has the center of mass approximately ¼-⅓ the length of the shaft closer to the club head.

FIG. 11 is presented for illustrative purposes, and is not meant to be limiting. Other sports, such as baseball, tennis, and fly fishing, would have different ancillary devices but the grip, weighting and center of mass more accurately simulate the actual sports equipment, and/or the mobile device could be attached to the actual sports equipment via the holder 20.

Figure 12A:
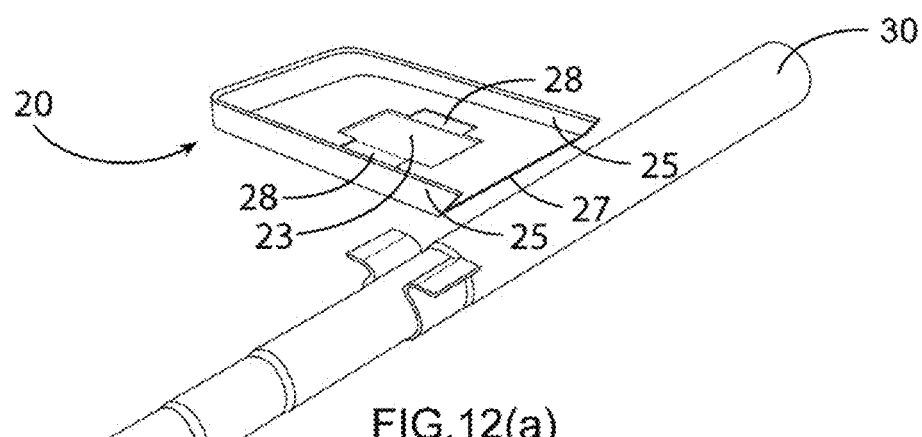
FIGS. 12(a) to (c) illustrates the mobile device holder of FIG. 11 being placed onto the ancillary device.
Figure 12B:
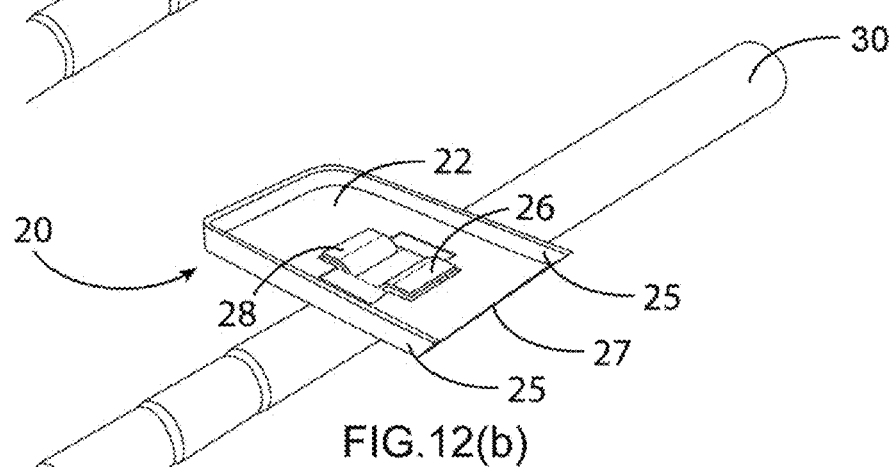
Figure 12C:
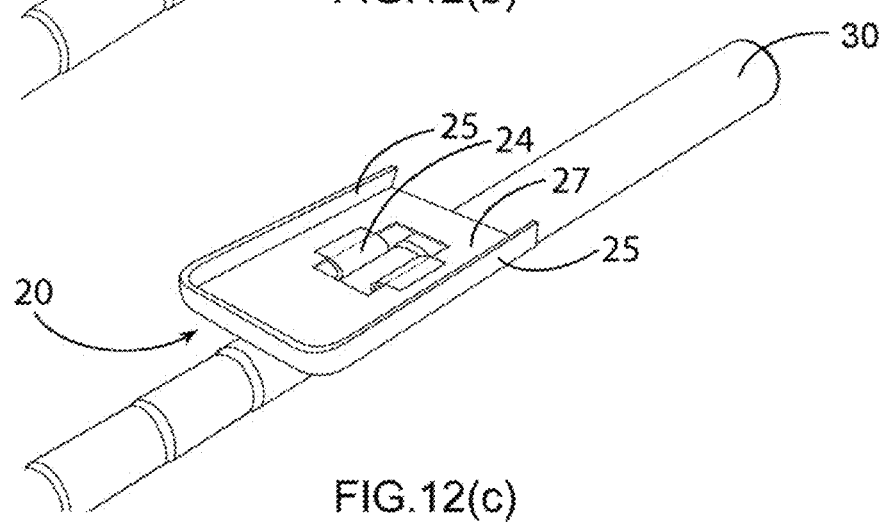

Referring to FIG. 12(*a*), the mobile device holder 20 comprises a two-piece assembly including a C-shaped coupler 24 and a frame 22. As shown, the frame 22 is rectangular and includes a pair of grooved sides 25 and an open end 27. The C-shaped coupler 24 is structured so as to snugly fit around the ancillary device 30 (as shown). As shown, the frame 22 includes hole 23. The hole 23 is sized to accommodate collar wings 26 of the C-shaped coupler 24, which can be fitted through the hole 23 such that the frame 22 is positioned perpendicularly relative to the longitudinal axis of the ancillary device 25, as shown in FIG. 12(*b*). Next, the frame 22 is turned 90 degrees such that the open end 27 points away from the club head, as shown in FIG. 12(*c*). Once turned 90 degrees, the collar wings 26 settle into pockets 28 molded on the inside of the frame 22. Once the collar wings 26 are seated, the mobile device 10 can be slid into the frame, the grooved sides 25 providing a secure friction fit. In an embodiment the materials used for the frame 22 include a hard polycarbonate, most preferably, co-molded silicon together with the polycarbonate for an enhanced friction fit with the mobile device 10. However, it is to be understood that various other materials may suffice, such as stainless steel, aluminum, or another metal; polyethylene, acrylonitrile-butyl-styrene (ABS), polyvinyl chloride, and nylon, or another plastic. Further it is to be understood that the particular manner in which the mobile device 10 is mounted to the ancillary device 30 (i.e., using the mobile device holder 20) is presented for illustrative purposes, and is not meant to be limiting.

As mentioned, an important feature of the present invention is that impact with a physical sports object, such as a golf or tennis ball, is not required. However, the player may, in various embodiments, attach the mobile device 10 to an ancillary device to hit physical balls. As an example detailed experiments were conducted with mobile devices 10 attached to actual sports equipment where professional athletes hit physical sports objects in order to validate the methods described in this invention.

While this invention has been described in conjunction with the various exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method of analyzing sports motions, comprising: (a) determining a starting point of a sports motion to be simulated using a mobile device having integrated motion sensors, wherein the starting point is indicated solely by a user holding the mobile device still for a predetermined length of time; (b) moving the mobile device from the starting point along a path to complete the simulation; (c) obtaining motion data from the motion sensors relating to the starting point and the movement along the path; (d) determining an occurrence of a simulated sports event using the obtained motion data; and (e) outputting information related to the simulated sports motion based at least in part on the simulated sports event, wherein the steps (c) to (e) are performed using a processor integral to the mobile device; (f) wherein the mobile device is not attached to any piece of sports equipment and the starting point is not indicated by user-entered input.

2. The method of claim 1, wherein the mobile device is a phone.

3. The method of claim 1, wherein outputting the information related to the simulated sports event includes outputting the information on a screen of the mobile device.

4. The method of claim 1, wherein outputting the information related to the simulated sports event includes outputting the information to a gaming system.

5. The method of claim 1, wherein the motion sensors include an accelerometer and a multi-axis gyroscope.

6. The method of claim 1, wherein the sports event is an impact point with a virtual object.

7. The method of claim 6, further comprising the step of determining the velocity of a virtual object around the impact point.

8. The method of claim 7, wherein determining the velocity is based at least in part on determined velocity of the mobile device around the impact point, determined arm length, determined club length, and determined arc length for a determined swing type.

9. The method of claim 7, wherein determining the velocity does not include use of data from an accelerometer.

10. The method of claim 7, wherein determining the velocity includes calculating the velocity using first motion data and applying a multiplier based on simultaneous second motion data.

11. The method of claim 6, further comprising determining the instantaneous velocity of a virtual object at the impact point.

12. The method of claim 6, wherein the impact point is determined by finding a moment when a first rotational orientation of the mobile device is at or near a minimum and the derivative of a second rotational orientation of the mobile device is at or near a maximum.

13. The method of claim 6, wherein the motion sensors include a multiaxis gyroscope, and the impact point is determined using two or more of pitch, roll, and yaw.

14. The method of claim 1, further including analyzing the simulated sports motion.

15. The method of claim 14, wherein analyzing the simulated sports motion includes analyzing one of the pitch, roll and yaw of the mobile device during the simulated sports motion.

16. The method of claim 14, wherein the simulated sports motion is determined based on a first motion of the mobile device during the simulated sports motion and a second motion of the mobile device at an impact point.

17. The method of claim 16, wherein analyzing the second motion of the mobile device at the impact point includes subtracting the second motion at the impact point from the second motion at the starting point.

18. The method of claim 1, wherein the sports event is a release point.

19. The method of claim 1, wherein the release point is one of a release point of a bowling ball, a lacrosse handle, a basketball, a baseball, a hockey stick, a bean bag, an American football and a fishing rod.

20. The method of claim 1, wherein outputting information related to the simulated sports motions includes outputting the information using at least one of the mobile device and a separate web-enabled display.

21. The method of claim 1, wherein outputting information related to the simulated sports motions includes outputting one or more of a rendered golf ball flight, a baseball flight, a basketball flight, a tennis ball movement, a ping pong ball movement, a bean bag toss, an American football flight, a bowling ball path, a fishing hook flight and other motion responsive to the simulated sports motion.

22. A system for analyzing sports motions, comprising: a mobile device including memory, a processor, an integrated multi-axis gyroscope, and a cloud-based engine which connects the mobile device and a web-enabled display with the Internet and manages game playing, and an analysis engine that includes an application program loaded in the memory of the mobile device, the mobile device configured to: (a) determine a starting point of a simulated sports motion, wherein the starting point is indicated solely by a user holding the mobile device still for a predetermined length of time; (b) obtain gyroscope measurements from the gyroscope relating to orientation of the mobile device at the starting point and during movement along a path simulating the sports motion; (c) determine an impact point with a virtual object and velocity of the mobile device around the impact point using the obtained gyroscope measurements; and (d) output information related to the simulated sports motion based at least in part on the impact point and the velocity.

23. The system of claim 22, wherein the mobile device is attached to an ancillary device.

24. The system of claim 23, wherein the ancillary device is a piece of sports equipment and a device simulating the grip and feel of the piece of sports equipment.

25. A system for analyzing sports motions, comprising: a mobile device including memory, a processor, integrated motion sensors, a cloud-based engine which connects the mobile device and a web-enabled display with the Internet and manages game playing, and an analysis engine that includes an application program loaded in the memory of the mobile device, the mobile device configured to: (a) determine a starting point of a simulated sports motion, the starting point is indicated solely by a user holding the mobile device still for a predetermined length of time; (b) obtain motion data from the motion sensors relating to orientation of the mobile device at the starting point and during movement along a path simulating the sports motion; (c) determine an impact point with a virtual object using the obtained motion data related to the orientation of the mobile device along at least two different axes; and (d) output information related to the simulated sports motion based at least in part on the impact point via the mobile device.

26. The system of claim 25, wherein the mobile device is attached to an ancillary device.

27. The system of claim 25, wherein the ancillary device is one of a piece of sports equipment and a device simulating the grip and feel of the piece of sports equipment.

28. The method of claim 1, wherein the starting point is indicated by the mobile device emitting a sound or vibration.

29. The method of claim 6, wherein the impact point is found at a minimum of one of pitch, roll or yaw of the mobile device along the path.

30. The method of claim 6, wherein the virtual object is a virtual golf ball.

31. The method of claim 7, wherein the virtual object is a virtual golf ball.

32. The method of claim 31, wherein determining the velocity is based at least in part on determined velocity of the mobile device around the impact point, determined arm length, determined club length, and determined arc length for a determined swing type.

33. The method of claim 31, further including determining ball flight distance based at least in part on the determined velocity of the virtual golf club head.

34. The method of claim 31, wherein determining the velocity includes applying a multiplier based on estimated wrist hinge and forearm rotation as measured by yaw and roll of the mobile device at the impact point.

35. The method of claim 1, wherein moving the mobile device from the starting point along the path includes swinging the mobile device to simulate a golf swing.

36. The method of claim 35, wherein the golf swing is one of a full golf swing, a chip, and a putt.

37. The method of claim 30, wherein the impact point is determined by finding a moment when pitch of the mobile device is at or near a second minimum.

38. The method of claim 14, wherein analyzing the simulated sports motion includes analyzing the pitch of the mobile device during the simulated sports motion.

39. The method of claim 17, wherein the second motion data is roll of the mobile device.

40. The method of claim 6, wherein the impact point is determined by finding a moment when a first rotational orientation of the mobile device is at or near a minimum and the derivative of a second rotational orientation of the mobile device is at or near a maximum.

41. The method of claim 40, wherein the first rotational orientation of the mobile device is pitch and the second rotational orientation of the mobile device is yaw.

42. The method of claim 2, wherein the screen of the phone is substantially perpendicular to the sports motion path at the calibration point of the sports motion.

43. The method of claim 42, wherein the sport is one of golf, baseball, basketball, tennis, bowling, ping pong, and bean bag tossing.

44. The method of claim 1, wherein moving the mobile device from the starting point along the path includes swinging the mobile device to simulate one of a golf swing, a baseball swing, a bowling motion, a tennis swing, a badminton swing, and casting of a fishing rod.

* * * * *